Sept. 2, 1941.  J. J. McCARTHY  2,254,438
INTERNAL COMBUSTION ENGINE
Filed April 13, 1940  3 Sheets-Sheet 1

Inventor:
John J. McCarthy
By Dike, Calver & Gray
Attorneys.

Sept. 2, 1941. J. J. McCARTHY 2,254,438
INTERNAL COMBUSTION ENGINE
Filed April 13, 1940 3 Sheets-Sheet 2

Inventor:
John J. McCarthy
By Dike, Calver & Gray
Attorneys.

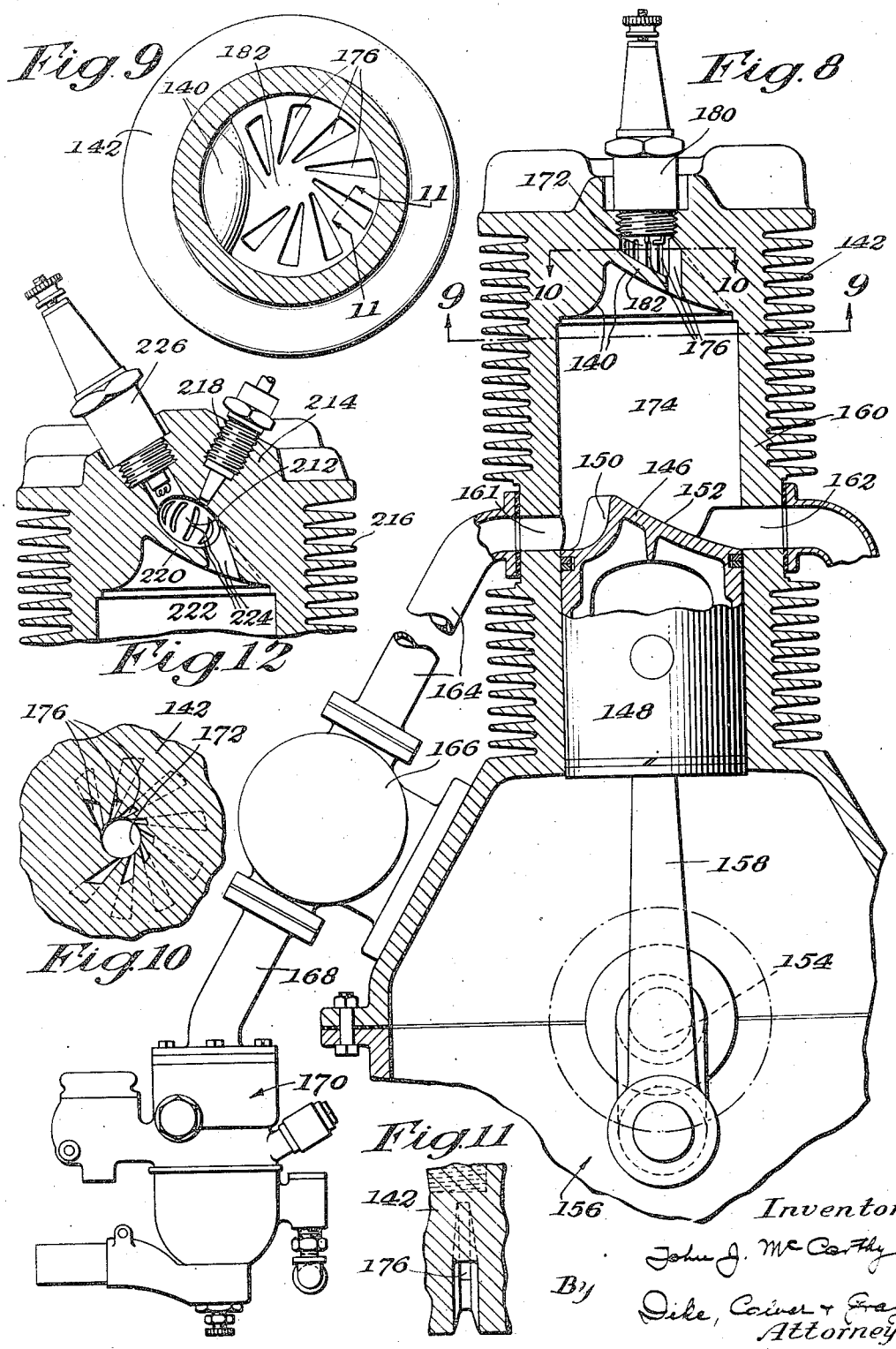

Patented Sept. 2, 1941

2,254,438

UNITED STATES PATENT OFFICE 2,254,438

INTERNAL COMBUSTION ENGINE

John J. McCarthy, Malden, Mass.

Application April 13, 1940, Serial No. 329,475

8 Claims. (Cl. 123—51)

This invention relates to internal combustion engines and more particularly to an engine of the low compression type.

It is the primary aim and object of the present invention to provide an engine wherein a fuel oil and air mixture will, when the engine has been started, self-ignite at a compression pressure which is well below the compression pressure in an engine operating on an Otto cycle.

It is also an object of the present invention to adapt the engine for operation with a gasolene and air mixture or a fuel oil and air mixture without involving any changes, whereby either mixture is derived from a conventional spray-jet carburetor.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Fig. 8 is a fragmentary section, partly in elevation, of a two-cycle engine which embodies the present invention in a modified manner;

Fig. 9 is a section taken on the line 9—9 of Fig. 8;

Fig. 10 is a fragmentary section taken substantially on the line 10—10 of Fig. 8;

Fig. 11 is a fragmentary section taken substantially on the line 11—11 of Fig. 9;

Fig. 12 is a fragmentary section through a cylinder and head of a solid injection type engine which embodies the present invention.

Figure 1:
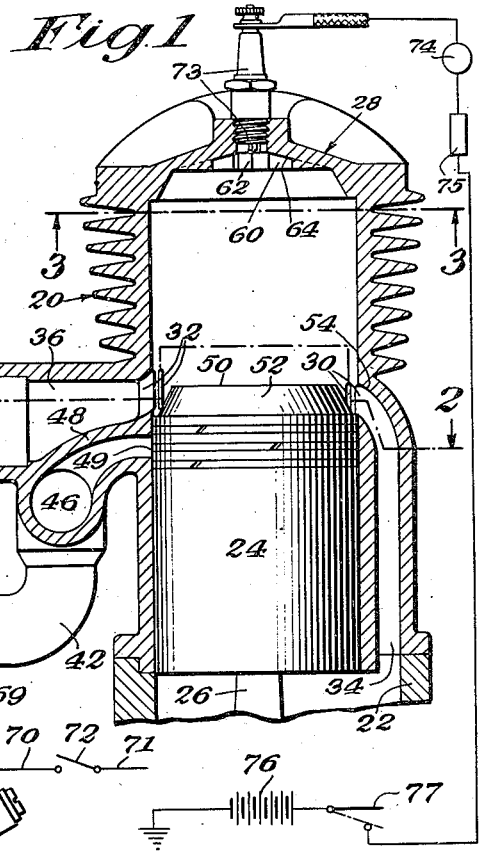
Fig. 1 is a fragmentary section, partly in elevation, of an engine embodying the present invention.

Referring to Fig. 1, the reference numeral 20 designates a cylinder which is suitably mounted on a sealed crank case 22. Slidable in the cylinder 20 is a working piston 24 which is connected with the usual crank shaft (not shown) in the crank case 22 by means of a connecting rod 26. The head 28 of the cylinder is shown as being integral with the latter, but the cylinder head may also be made a separate part and detachably mounted on the cylinder. The cylinder 20 is provided with opposite intake and exhaust ports 30 and 32, respectively, of which the intake ports 30 are in communication with the interior of the crank case 22 through a passage 34 in the cylinder, while the exhaust ports 32 communicate with the passage 36 which leads to exhaust manifold 38. Mounted at 40 on one end of a conduit 42 is a conventional spray-jet carburetor 44 which may communicate with a supply of either gasolene or fuel oil. The discharge channel 45 of the carburetor communicates with the passage 46 in the conduit 42. A length of this passage 46 is separated from the exhaust passage 36 by a comparatively thin wall 48 and has an inlet 49 to the cylinder below the exhaust ports 32. A cold mixture flowing from the carburetor through the passage 46 into the cylinder comes into heat exchange contact with the thin partition wall 48 and absorbs the heat imparted to said wall by the hot exhaust gases in the passage 36, thus increasing the thermal efficiency of the engine. A mixture from the carburetor 44 is drawn into the cylinder and the sealed crank case when the piston uncovers the inlet 49 at the end of its compression stroke. This is due to the fact that a partial vacuum is created in the crank case during the compression stroke of the piston when the effective volume of the sealed crank case is increased by an amount equal to the piston displacement. During the following expansion stroke of the piston, the mixture in the crank case is compressed until the piston uncovers the intake ports 30 and permits the compressed mixture to escape through said ports into the cylinder chamber. This being a two-cycle engine, the piston 24 is provided with a conical head 50 whose periphery 52 is adapted to deflect the inflowing, compressed mixture upwardly against the cylinder head 28, i. e., away from the products of the previous combustion escaping through the exhaust ports 32. To offer a minimum of resistance to the mixture as it is deflected upwardly against the cylinder head, the intake ports 30 are preferably inclined in the manner shown at 54 in Figs. 1 and 4.

Figure 4:
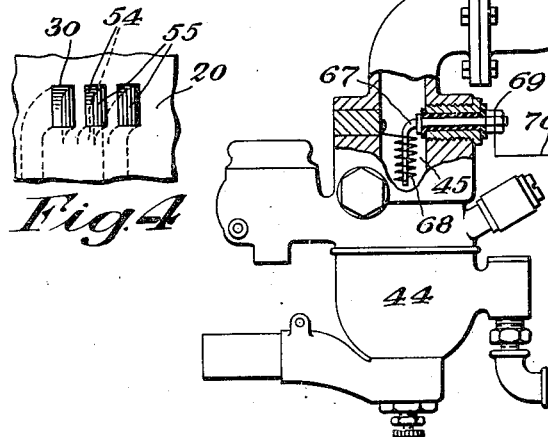
Fig. 4 illustrates the arrangement of the intake ports as viewed in the direction of the arrow 4 in Fig. 2.
Figure 3:
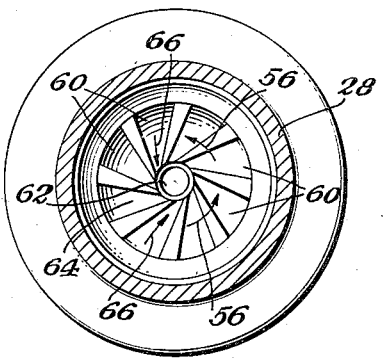
Fig. 3 is a section taken on the line 3—3 of Fig. 1.
Figure 2:
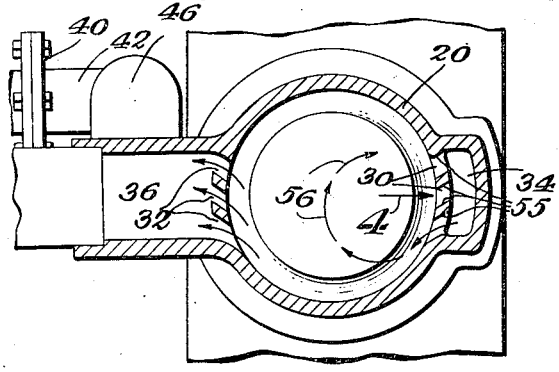
Fig. 2 is a fragmentary section taken on the line 2—2 of Fig. 1.

To provide for turbulence of the admitted mixture in the cylinder chamber prior to its combustion, the intake ports 30 are arranged tangentially in the manner shown at 55 in Figs. 2 and 4. Hence, the admitted mixture will whirl in the direction of the arrows 56 (Figs. 2 and 3). To increase the turbulence of the whirling mixture, the cylinder head 28 is provided with a plurality of grooves 60 (see also Fig. 3) which merge tangentially into a central recess 62 and whose bottoms 64 are inclined as shown in Fig. 1. The piston on its compression stroke forces the whirling mixture into these grooves 60, whereby the mixture is redirected into the central recess 62 as indicated by the arrows 66 in Fig. 3, with the result that the mixture is highly turbulent within and in the immediate vicinity of the central recess 62 when the combustion occurs.

I have discovered that, once an engine is started, a fuel oil and air mixture in the cylinder or cylinders thereof will self-ignite at a compression pressure which is below the compression pressure in an engine operating on an Otto cycle, if the mixture is highly turbulent at the time of combustion. By way of example, the engine illustrated in Fig. 1 has performed very satisfactorily at a compression pressure of 45 and 50 lbs. per square inch which is well below the average compression pressure in an engine operating on an Otto cycle. The reason for the self-ignition of a fuel oil and air mixture at this low compression pressure lies undoubtedly in the liberation and ignition of the more volatile constituents of the fuel oil by the heat of the compressed mixture and the high turbulence of the same, whereupon the flame rapidly propagates to the less volatile constituents of the fuel oil and burns the same explosively.

To start the cold engine, the fuel oil and air mixture requires pre-heating in order to ignite when the engine is turned over. Once the engine runs, the mixture need not be pre-heated any longer. In order to pre-heat the mixture, a glow plug 67 is mounted in the discharge channel 45 of the carburetor, said plug having its heating coil 68 grounded through the carburetor and its terminal 69 connected with a battery through leads 70, 71 and a switch 72 which may be manually opened and closed. Thus, the operator may open the switch 72 immediately when the engine operates under its own power. The glow plug may also be placed into the cylinder head instead of the discharge end of the carburetor, or the glow plug may be entirely dispensed with if the engine is started with gasolene and operated with fuel oil. In the latter case, a special carburetor may be used and a spark plug 73 in the cylinder head 28 is essential. The spark plug 73 is connected with a conventional circuit breaker or distributor 74 which is operated by the engine and connected with a conventional ignition coil 75 which is in turn conected with a battery 76. Preferably, a manual switch 77 is provided for opening and closing the well known primary circuit through the ignition coil. The jump-spark ignition may be discontinued when the engine has been started and oil has been substituted for gasolene as fuel, or the ignition may be continued whereupon the sparks assist in combusting the fuel oil and air mixture, particularly when the engine operates at low speeds. By using a conventional adjustable distributor 74, the combustion may also be advanced or retarded. Finally, the engine may be operated with gasolene, if desired, in which case the jump-spark ignition is continuously operative. Hence, the present engine may be operated with fuel oil or gasolene without necessitating any changes or any exchange of parts.

Figure 6:
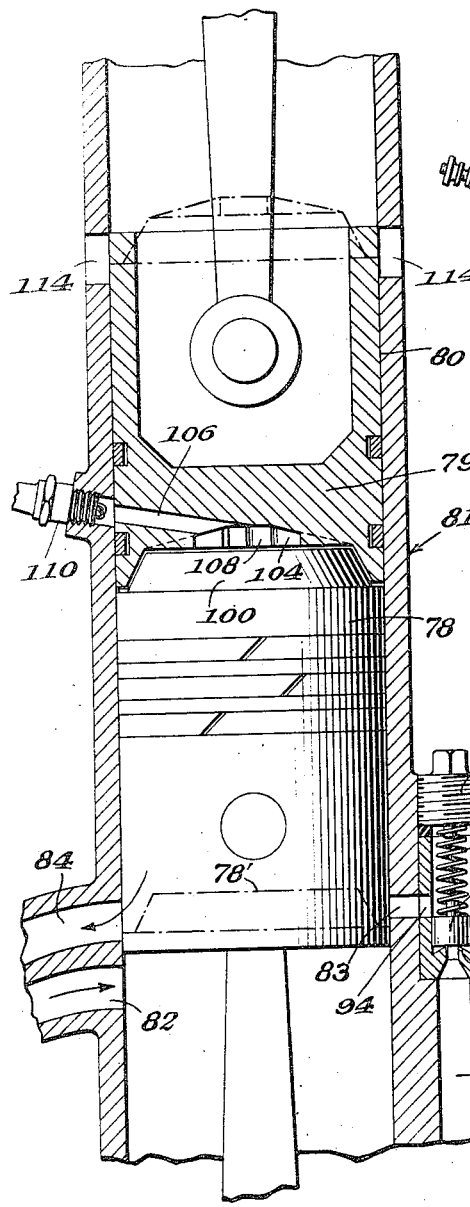
Fig. 6 is a fragmentary section through an opposed-piston type engine which embodies the present invention.
Figure 7:
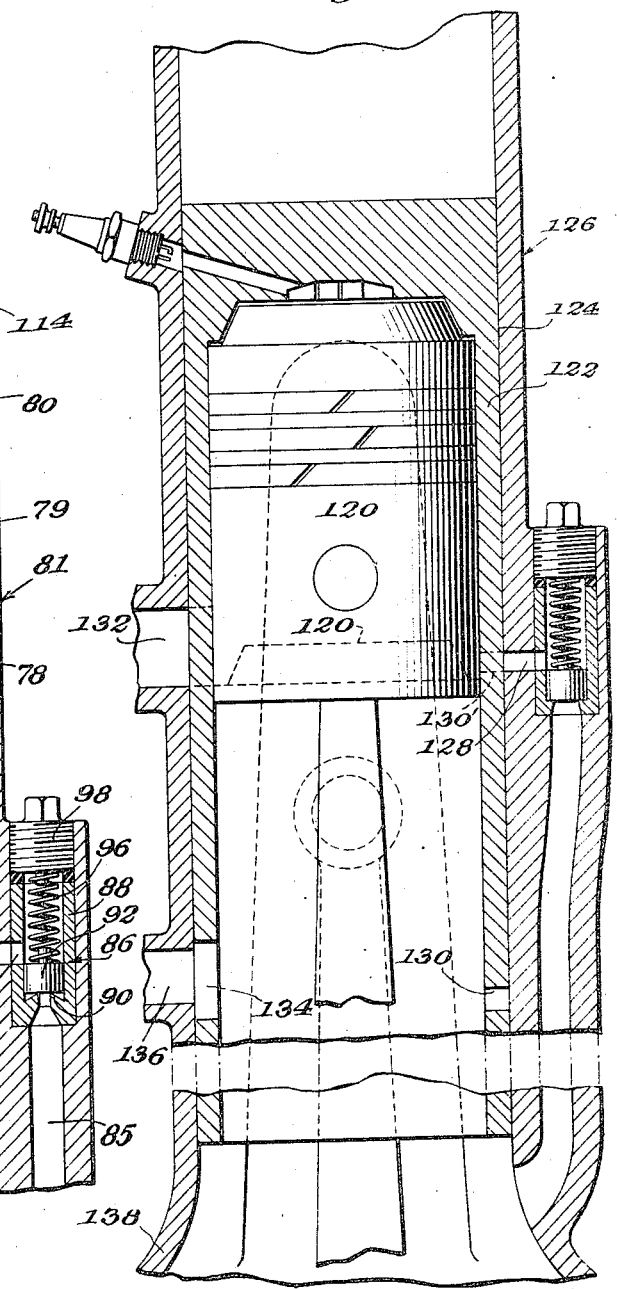
Fig. 7 is a fragmentary section through another opposed-piston type engine which embodies the present invention.

While Fig. 1 shows the invention embodied in a cylinder having a single working piston therein, Figs. 6 and 7 illustrate the invention embodied in engines of two different opposed piston types. In the engine shown in Fig. 6, two opposed working pistons 78 and 79 slide on the wall 80 of a cylinder 81. The pistons 78 and 79 are shown in their inner dead center positions in which the lower piston 78 uncovers an inlet 82 which is in communication with the discharge side of a conventional spray jet carburetor (not shown). A gasolene and air mixture or a fuel oil and air mixture is drawn from the carburetor into the cylinder 81 through the uncovered inlet 82 and into a sealed crank case (not shown) on which the cylinder is mounted. During the following expansion stroke of the pistons, piston 78 covers the inlet 82 and then compresses the mixture in the crank case. Toward the end of its expansion stroke into the dot-and-dash line position 78' in Fig. 6, the piston 78 uncovers intake and exhaust ports 83 and 84, respectively. The intake port communicates with the interior of the crank case through a passage 85 in the cylinder so that the compressed mixture may escape into the cylinder chamber when the piston 78 uncovers said intake port. Preferably, a check valve 86 is provided in the passage 85 to delay the escape of the compressed mixture from the crank case into the cylinder chamber until the piston 78' has substantially concluded its expansion stroke and most of the products of the previous combustion have escaped through the exhaust port 84. The check valve consists in the present instance of a shell 88 which is provided with a seat 90 for a valve member 92 and a duct 94 which registers with the intake port 83. The valve member 92 is normally urged against its seat 90 by a pre-loaded spring 96 whose upper end bears against a plug 98 and whose compression is such that it will permit said valve member to raise from its seat only when the pressure of the products of combustion in the cylinder chamber is greatly reduced, i. e., after the exhaust ports have been partially uncovered. The piston 78 is provided with a deflecting head 100 which is similar to that of the piston 24 in Fig. 1, while the other piston 79 has in its head a turbulence-creating structure 104 which is similar to that in the cylinder head 28 in Fig. 1. The piston 79 is preferably also provided with a duct 106 which leads from the central recess 108 of the turbulence-creating structure to the periphery of the piston and aligns with a glow plug 110 in the cylinder wall when said piston is substantially at the end of its compression stroke. The glow plug will primarily assist in starting the engine. A second duct similar to duct 106 may be provided in the piston 79 to align at the time of combustion with a spark plug (not shown) which may serve for the same purposes as the spark plug 73 in Fig. 1. The exhaust port 84 may be augmented by further exhaust ports 114 which are covered and uncovered by the piston 79. The piston 79 has preferably a slight lead over the other piston so that the ports 114 are covered by piston 79 before piston 78 covers the other exhaust port 84.

The engine shown in Fig. 7 differs from that shown in Fig. 6 therein that one piston 120 slides in a long sleeve of the other piston 122 which in turns slides on the wall 124 of a cylinder 126. The pistons 120 and 122 are shown in their inner dead center positions and their operation is evident in view of the preceding description of the opposed piston type engine shown in Fig. 6. Of course, the intake and exhaust ports of the engine shown in Fig. 7 are differently arranged in consequence of the sleeve-type piston 122. Thus, communication between the cylinder chamber and the intake port 128 is established through intermediation of a port 130 in the sleeve-type piston which aligns with the intake port 128 as shown at 130' when said piston 122 is substantially at the end of its expansion stroke. Communication between the exhaust port 132 and the cylinder chamber is accomplished through intermediation of a port 134 in the sleeve-type piston 122 which aligns with said exhaust port when said piston is substantially at the end of its expansion stroke. An inlet 136, which communicates with the discharge side of a conventional spray-jet carburetor (not shown), may communicate with the interior of the cylinder and the interior of a sealed crank case 138 through intermediation of the port 134 in the sleeve-type piston 122 when both pistons are substantially at the end of their compression stroke as shown in full lines in Fig. 7.

Fig. 8 shows another two-cycle engine, having a turbulence-creating structure in the cylinder head which is different from that shown in Fig. 1. More particularly, the inner surface 140 of the cylinder head 142 is shaped to correspond to the head 146 of a conventional two-cycle piston 148 with its deflecting baffles 150 and 152. The piston 148 is connected with the crank shaft 154 in the crank case 156 by a conventional connecting rod 158. The cylinder 160 is provided with intake and exhaust ports 161 and 162, respectively, of which the former communicates through a conduit 164 with the discharge end of a conventional supercharger 166 whose intake end communicates through a conduit 168 with a conventional spray-jet carburetor 170. The supercharger 166 is conveniently mounted on the crank case 156. It is to be understood that a similar supercharger may be employed in the engine shown in Fig. 1 in lieu of the illustrated supercharger which includes the sealed crank case and the working piston in the cylinder.

Provided in the cylinder head 142 is a small chamber 172 which communicates with the cylinder chamber 174 through a plurality of passages or channels 176. These channels lead tangentially into said small chamber in the manner best shown in Fig. 10. The supercharger 166 is preferably driven by the engine in any suitable manner and performs so that a gasolene and air mixture or a fuel oil and air mixture, drawn by the supercharger from the carburetor 170, is compressed to a maximum pressure which is well below the compression pressure of the present engine which, in turn, is well below the compression pressure in an engine operating on an Otto cycle. The compressed mixture is admitted into the cylinder chamber 174 through the intake port 161 when the piston uncovers said port, and the admitted mixture is deflected by the baffle 150 upwardly against the cylinder head, i. e., away from the products of the previous combustion which escape through the exhaust port 162. The mixture is then compressed by the ascending piston 148 and forced through the channels 176 into the small chamber 172 in which the mixture whirls at great speed due to its passage through the tangentially arranged channels 176. Shortly before the piston concludes its compression stroke, the mixture in the small chamber 172 explodes and the flame of the explosion rapidly propagates to the remaining mixture and causes its explosion.

If the engine shown in Fig. 8 is to be run with gasolene, an electric ignition system of the jump-spark type and including a spark plug 180 in the central chamber 172 is to be continuously operative in order to run the engine. The spark plug 180 may also be used to assist in combusting a fuel oil and air mixture if the engine is run with fuel oil. A glow plug (not shown) may also be provided to assist in starting the engine when the same runs on fuel oil. The relative thinness of the partition 182 between the small chamber 172 and the cylinder chamber 174 and its relatively isolated location between these chambers, which is due to the numerous channels 176 that reduce the contact area between said partition and the rest of the cylinder head to a minimum, is of great advantage particularly when the engine is run with fuel oil. Obviously, the thin and relatively isolated partition 182 is exposed on both sides to the combustion of the mixture and will be heated accordingly, and its heat assists greatly in atomizing each fresh fuel oil and air charge and igniting the same at the previously mentioned low compression pressure and even without an electric spark.

Figure 5:
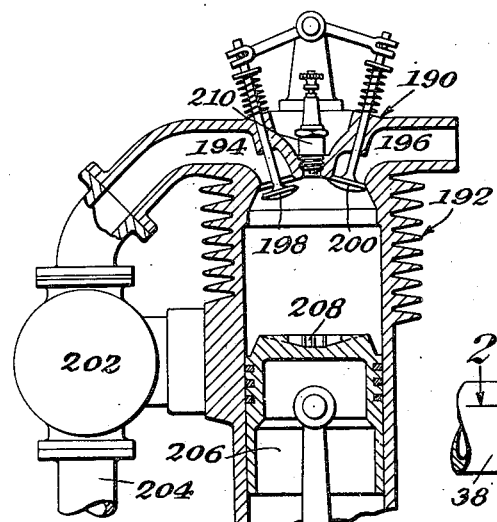
Fig. 5 is a fragmentary section, partly in elevation, of a four-cycle engine which embodies the present invention.

Fig. 5 shows a four-cycle engine in which the present invention is embodied. The head 190 of the cylinder 192 is provided with intake and exhaust ports 194 and 196, respectively, which are opened and closed by conventionally operated intake and exhaust valves 198 and 200, respectively. The intake port 194 is in communication with the discharge end of any conventional supercharger 202 whose intake side communicates with the discharge end 204 of a conventional spray-jet carburetor. The piston 206 in the cylinder has in its head a turbulence-creating structure 208 which may be similar to the turbulence-creating structure 60, 62 in the cylinder head shown in Fig. 1. A spark plug 210 in the cylinder head may serve for the same purposes as the spark plug 73 in the engine shown in Fig. 1, and a glow plug (not shown) may also be provided in the cylinder head, for instance, to assist in starting the engine when the same is run with fuel oil.

Fig. 12 illustrates an engine whose cylinder head is similar to that of Fig. 8 as far as the turbulence-creating structure is concerned, but the present engine does not have a carburetor for mixing the fuel oil and air and instead uses solid fuel injection. The central chamber 212 in the head 214 of the cylinder 216 is preferably oval or sphere-shaped and fuel oil from a fuel pump (not shown) is forced at the proper times through a fuel injector 218 in the cylinder head against the dish-shaped bottom wall 220 of said chamber. The chamber 212 communicates with the cylinder chamber 222 through a plurality of channels 224 which lead tangentially into the chamber 212. The dish-shaped bottom wall 220, which is a partition wall between both chambers 212 and 222, is equally as thin and relatively isolated as the partition 182 in the engine shown in Fig. 8, and is also exposed at both sides to the combustion, wherefore said bottom wall 220 becomes extremely hot and immediately vaporizes the fuel oil sprayed thereagainst and greatly contributes to the quick and complete combustion of the charge. A glow plug 226 may be provided in the cylinder head to assist in starting the engine.

I claim:

1. In an internal combustion engine, the combination of a cylinder; a piston in the cylinder forming a chamber therein; a spray-jet carburetor containing fuel oil; means for drawing a fuel oil-and-air mixture from the carburetor and delivering it into said chamber when the piston is substantially in its innermost position; and cooperating structure in the cylinder rendering the delivered mixture turbulent substantially during the entire compression stroke of the piston so that maximum turbulence prevails substantially at the end of said compression stroke.

2. In an internal combustion engine, the combination of a cylinder; a piston in the cylinder forming a chamber therein; a spray-jet carburetor containing fuel oil; means for drawing a fuel oil-and-air mixture from the carburetor and delivering it into said chamber when the piston is substantially in its innermost position; and cooperating structure in the cylinder rendering the delivered mixture increasingly turbulent substantially during the entire compression stroke of the piston.

3. In an internal combustion engine, the combination of a cylinder; a piston in the cylinder forming a chamber therein; a spray-jet carburetor containing fuel oil; means for drawing a fuel oil-and-air mixture from the carburetor and delivering it into said chamber when the piston is substantially in its innermost position; and turbulence-creating structure in the cylinder comprising a central recess in one of the opposite end walls of said chamber and grooves in said one end wall extending inwardly toward said recess and merging tangentially into the latter.

4. In an internal combustion engine, the combination of a cylinder; a piston in the cylinder forming a chamber therein; a spray-jet carburetor containing fuel oil; means for drawing a fuel oil-and-air mixture from the carburetor and delivering it into said chamber when the piston is substantially in its innermost position; and turbulence-creating structure in the cylinder comprising a small chamber in the cylinder head and channels forming the sole communication between the cylinder chamber and said small chamber and leading tangentially into the latter.

5. In an internal combustion engine, the combination of a cylinder; a piston in the cylinder forming a chamber therein; a spray-jet carburetor containing fuel oil; means for drawing a fuel oil-and-air mixture from the carburetor and delivering it into said chamber when the piston is substantially in its innermost position; and turbulence-creating structure in the cylinder comprising in the cylinder head a small chamber having a top surface, a bottom surface and a substantially cylindrical side surface of which the bottom surface is separated by a thin wall from the cylinder chamber, and channels forming the sole communication between said chambers and merging into said side surface tangentially thereof.

6. In an internal combustion engine, the combination of a cylinder; a piston in the cylinder forming a chamber therein; a spray-jet carburetor containing fuel oil; means for drawing a fuel oil-and-air mixture from the carburetor and delivering it into said chamber when the piston is substantially in its innermost position; and turbulence-creating structure in the cylinder comprising in the cylinder head a small chamber having a top surface, a bottom surface, and a substantially cylindrical side surface of which the bottom surface is separated by a thin wall from the adjacent end surface of the cylinder chamber, and channels in said head substantially surrounding said small chamber and forming the sole communication between said chambers, said channels extending tangentially of said side surface and opening into said side surface substantially throughout the height of the latter and into said end surface between the cylinder periphery and the bottom surface of said small chamber, and the bottoms of said channels being inclined to the cylinder axis throughout their length.

7. In a two-cycle internal combustion engine, the combination of a cylinder having intake and exhaust ports; two opposed pistons movable in the cylinder and forming a chamber therein; a spray-jet carburetor containing fuel oil; turbulence-creating structure on a piston head; and means for drawing a fuel-oil-and-air mixture from the carburetor and delivering it into said chamber through said intake port every time said ports are uncovered by the pistons toward the end of their expansion stroke, the pistons on their compression stroke forcing the mixture against said structure which renders said mixture so highly turbulent that the same self-ignites at a compression pressure which is lower than the compression pressure in a mixed cycle.

8. In a four-cycle internal combustion engine, the combination of a cylinder; engine-operated intake and exhaust valves in the cylinder head; a piston in the cylinder forming a chamber therein; a spray-jet carburetor containing fuel oil; turbulence-creating structure in said chamber; and means for drawing a fuel oil-and-air mixture from the carburetor and delivering it into said chamber on opening of the intake valve, the piston on its compression stroke forcing the mixture against said structure which renders said mixture so highly turbulent that the same self-ignites at a compression pressure which is lower than the compression pressure in a mixed cycle.

JOHN J. McCARTHY.